Sept. 20, 1966  C. VRANA  3,273,671
LOAD TRANSFER DEVICE AND BRAKING ARRANGEMENT
Filed Dec. 20, 1963  3 Sheets-Sheet 1

INVENTOR.
CARLOS VRANA
BY *Aussender + Thomas*
ATTORNEYS

INVENTOR.
CARLOS VRANA
ATTORNEYS

United States Patent Office 3,273,671
Patented Sept. 20, 1966

3,273,671
LOAD TRANSFER DEVICE AND BRAKING
ARRANGEMENT
Carlos Vrana, Long Island City, N.Y., assignor to Kantfall
Products Corp., Brooklyn, N.Y., a corporation of New
York
Filed Dec. 20, 1963, Ser. No. 332,226
2 Claims. (Cl. 188—44)

The present invention relates to a load transfer and braking arrangement, which more particularly is adapted to act as a braking mechanism preventing a reversal of movement of a loaded or tensioned object upon release of support or tension or movement impelled by an unsupported load or tension. Various types of load members or platforms are utilized to support men, materials and heavy devices such as elevators, dumbwaiters, ski-tows, lift-trucks, platform truck and lifts, overhead hoists, automotive cranes, lifeboat davits, roll-up doors, bosun's chairs, breeches buoy, cabin cars, theatrical curtains, suspended chandeliers, derricks, windows, as well as to many others of similar and like nature. The load members in which the present invention is adapted to prevent movement reversal upon release of the support or tensioning or movement impelled by an unsupported load or tension, have in common a prime mover or support directly or indirectly in contact with the load member and a separate means to support a load when the prime support is removed. The separate means may be a cable or the like or another phase of a rigid support such as the upright of a jack or the guide bar of an elevator.

The present invention has among other things safety applications which prevent movement reversal of supported man or supported material loads due to operational failure of the means supporting the load, or movement impelled by an unsupported load or tension, whether it be a rope, cable, holding dog of a jack, pin, cotter pin, gear pinion, or whether such failure is due to metal crystalization of a supporting means or otherwise. The present invention is usually interposed between the force for moving or supporting a load and a linkage to the load and operates to transfer a load to a secondary support means upon failure of the prime force.

The prevention of movement away from the direction of support or tension, especially the sudden movement which might follow the snapping of a load supporting cable has many important applications for the protection of human life and limb and valuable material. Various attempts have been made to prevent these damages, but these attempts have resulted in mechanisms which are clumsy, complex, unreliable, inadequate and which suffer from many shortcomings.

One such shortcoming, for example, is the excessive tilting of the supporting platform of a scaffold by mechanisms designed to halt the fall of such platform. A severe tilt coupled with the severe jolt accompanying an abrupt stopping of the fall of the platform can cause men and materials to fall from the paltform with the same disastrous results ensuing from the rope or cable failure. Thus, quite often, the proposed remedy is as bad as the difficulty it is intended to obviate, to the great detriment of life, limb and propery.

In accordance with the present invention, a control means is utilized on a load or load member which is normally under the control of the external force of supporting means such as, among other things, rope, cable, wire, chain, holding dog or tensioning load or the like, which external force is substantially parallel to an elongated member, and which transfers the load of the load members and applies a wedging force engaging the elongated member upon the removal of the external force. The load transfer, locking force acts as a brake grasping the elongated member which is quickly released for normal operation upon resumption of the external force or condition of tensioning, so that normal operation may be easily resumed upon reapplication of the external force.

Another interesting feature of the present invention is that it can be set to grasp and transfer an unsupported load so rapidly that no dangerous momentum buildup is permitted. In its safety application, the wedged transferred load is almost tamper proof since disengagement of the load transfer requires substantially the application of the full external force originally supplied. A man is thus spared, for instance, the danger of trying to self release by tampering until new support is supplied; for example, upon the snapping of a scaffold, a new support cable would have to be installed before a scaffold could resume its normal traverse downward.

Although such novel feature or features believed to be a characteristic of the invention are pointed out in the claims, the invention and the manner in which it may be carried out, may be further understood by reference to the description following and the accompanying drawings, wherein:

Referring now to the figures in greater detail, where like reference numbers denote like parts in the various figures, FIG. 1 illustrates an embodiment of a housing for the load transfer arrangement of the present invention.

Figure 1:
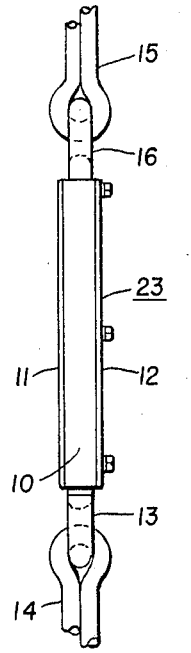
FIG. 1 is a side view of an embodiment of a housing for a load transfer arrangement of the present invention.
Figure 2:
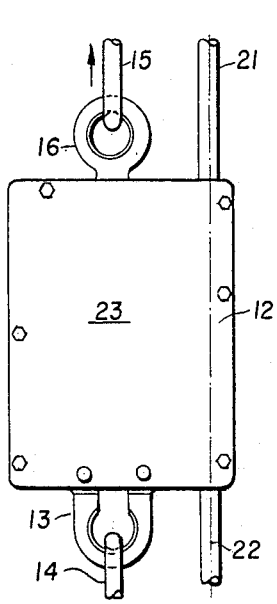
FIG. 2 is a front view of the embodiment of FIG. 1.

In FIG. 1, a suitable housing for the load transfer arrangement of the present invention may comprise a body 10, two cooperating covers 11 and 12 which are adapted to be joined after the components of the load transfer arrangement are mounted within the body 10 and covers 11 and 12. The load transfer arrangement housing is affixed to the load member such as a platform by any suitable means such as, for example, a coupling link 13 and rope, chain, cable, wire or the like 14 which is affixed to said load member.

The load tarnsfer arrangement mounted in the housing is actuated by the release of the pulling or pushing force 15 applied through the load under the normal tension of loading. Thus, the device of the present invention is interposed directly or indirectly to a load member such as between links 13 and 16. The load member is maintained free to normally operate as long as the force 15 is actuating the mechanism permitting free movement. Upon release of the force 15 the load is transferred to an elongated member 21 which must be separtely supported and reversal of direction of movement or movement itself impelled by an unsupported load or tension is inhibited.

The substantially elongated member 21, which may comprise a rope, cable, wire, substantially rigid bar or the like is separately supported at a point spaced from the load member such as the roof of a building if the load member be a scaffold, the mast of a ship if the load member is a bosun's chair, or the end of a crane if the load member is the hook of a crane. If the load member is the load on the holding portion of a jack, the supporting lifting means and the elongated member 21 are the same member and are supported at the base of the jack. The load transfer in such instance is from the holding dog of the jack which works off the support member, to the support member itself. In the case of a scaffold, the member 21 may comprise a rope separately supported on the roof of the building from which the scaffold is supported and extending to a point beneath the scaffold to allow the member 21 to cover the full traverse of the scaffold.

Figure 3:
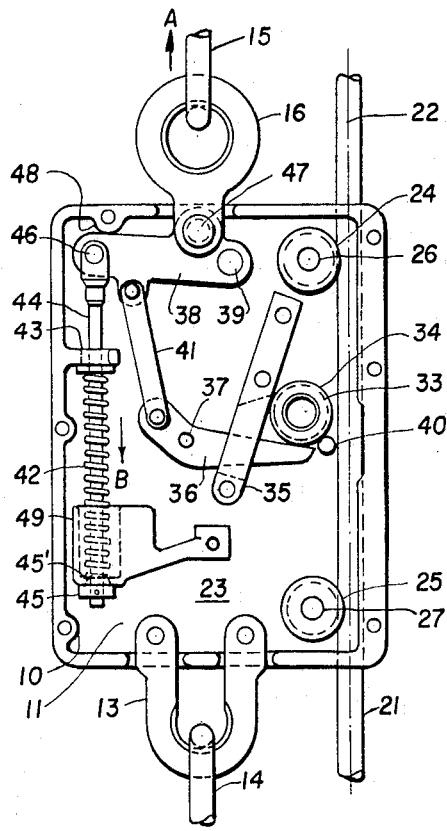
FIG. 3 is a front view, partly in section, of an embodiment of the load transfer arrangement of the present invention in a normal position with an external force applied to the mechanism.
Figure 4:
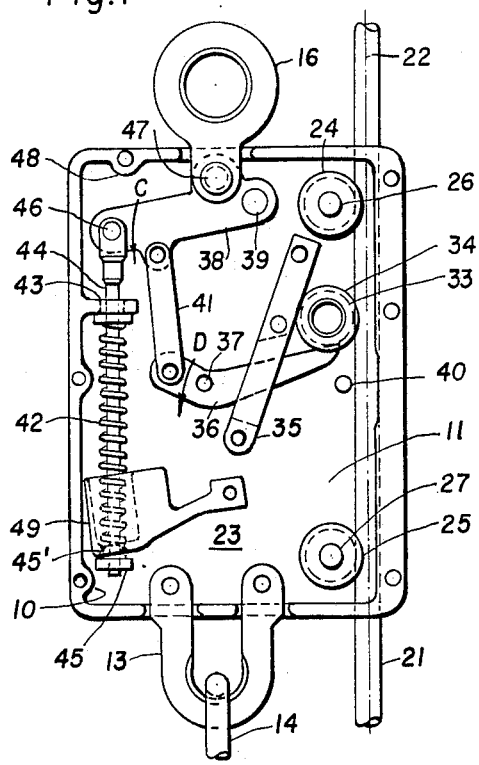
FIG. 4 is a front view, partly in section, of the embodiment of FIG. 3 in locked position.

The member 21 has an axis 22 as shown in FIGS. 3 and 4 and a carrier 23, which may comprise the body 10 and covers 11 or 12 (FIG. 1); the carrier 23 is slidably mounted on the member 21 and moves substantially parallel to the axis 22 of said member 21 with the load member as said load member is moving or held by its supporting member during normal operation.

Figure 9:
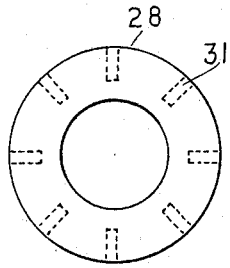
FIG. 9 is a front view of an embodiment of an annular wedging member of the braking means of the braking transfer arrangement of the present invention.
Figure 10:
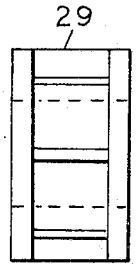
FIG. 10 is a side view of the embodiment of FIG. 9.
Figure 11:
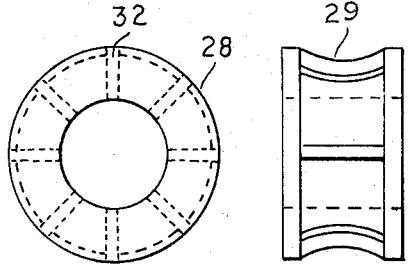
FIG. 11 is a front view of a modification of the embodiment of FIG. 9.
Figure 12:
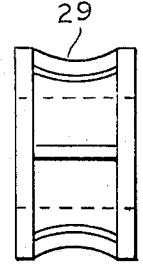
FIG. 12 is a side view of the modification of FIG. 9.

A guide arrangement is mounted on the carrier 23 to guide the carrier and the member 21 for movement of said carrier substantially parallel to the axis 22 of said member with the load transfer arrangement of the said carrier in operative proximity with the said member. The guide arrangement may comprise annular guide rollers 24 and 25 rotatably mounted on the carrier 23 by suitable means such as, for example, pins 26 and 27, respectively. Each of the guide rollers 24 and 25 has a peripheral surface 28 (FIG. 9) and 28' (FIG. 11) and a rounded groove 29 (FIG. 10) and 29' (FIG. 12) is formed in the peripheral surface of each guide roller.

The guide rollers 24 and 25 serve primarily to guide the member 21 and the load transfer arrangement of the carrier 23 relatively to each other so that the carrier 23 is freely slidable on the member 21 and the member 21 is in operative proximity with the load transfer arrangement. The member 21 fits into the rounded groove formed in the periphery of each guide roller 24 and 25 and when these guide rollers are notched, the notches formed in the rounded groove of each guide roller serve to pick up grit, grease and the like material which may be on the member 21 and which may impair the quick gripping of member 21 and prevent movement reversal upon release of tension supporting the pulling or pushing force 15. The guide rollers may thus serve to clean or maintain the member 21. If the guide rollers of FIGS. 23 and 24 are utilized, the grit, grease, grime and the like picked up or scraped from the member 21 are conducted through the notches 32 to the inside of each roller where it is out of the way, does not interfere with the proper operation of the load transfer arrangement and may be further dispelled through said opening to avoid clogging. When either by design or intent the force 15 is removed, for example, through a cable failure or breakage of a gear pinion or of the linkage 16 the device of the present invention is actuated to grasp the member 21.

In each of the embodiments of the present invention, the carrier 23 is adapted to move substantially parallel to the axis 22 of the member 21 and the member 21 may be guided in position by guide rollers 24 and 25 of their equivalent, if desired. The load transfer arrangement moves substantially parallel to the axis 22 of the member 21 with the carrier 23, which in turn may be moved with the load member by the force 15, which may, for instance, be applied to link 16.

Figure 5:
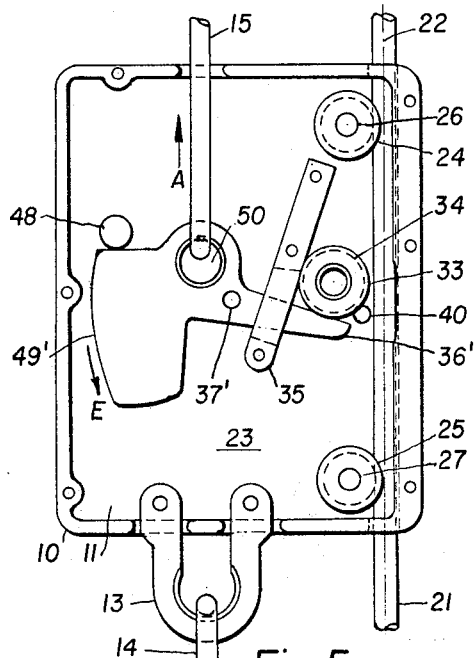
FIG. 5 is a front view, partly in section, of a modification of the embodiment of FIG. 3 in a normal position with an external force applied to the mechanism.
Figure 7:
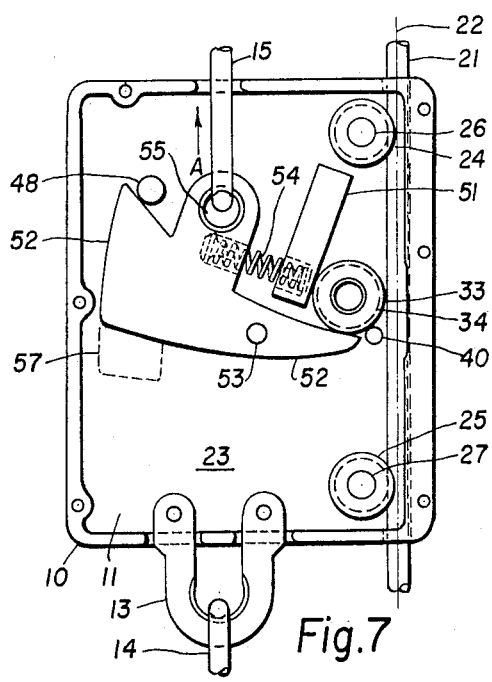
FIG. 7 is a front view, partly in section, of another embodiment of the load transfer arrangement of the present invention in a normal position with an external force applied to the mechanism.

In each embodiment of the present invention, the load transfer arrangement comprises a wedging member, wedging means or a wedging guide mounted on or within the carrier 23 for directing the weddging member toward or away from the member 21 and a moving member or members for moving the wedging member into locked position wedging it between the wedging guide and the member 21. The force 15 applied to the moving member of the load transfer arrangement during normal operation of the carrier 23 as depicted in FIGS. 3, 5 and 7 maintains the load transfer arrangement unlocked relative to the member 21 with the wedging member of the load transfer arrangement spaced from the member 21. Normal operation of the carrier 23 is normal operation of the load member and means that the load member is normally supported, exerting force 15 and may move in a usual manner.

Each embodiment of the present invention permits locking upon removal of the force 15 and the transfer of the load to member 21 actuated either by gravity, inertia or by spring actuation or a combination thereof. After normal actuation of the load transfer no harm is usually done to the load transfer mechanism or the elongated member 21, thus upon reapplication of the force 15 the normal traverse of the load member may be resumed. While the present invention is predicated upon independent actuation by any one of the above-mentioned modes, the preferred embodiment includes combining all three so that where certainty is important, especially in safety applications of the present invention, failure of one or another mode of operation will still see the grasping action by wedging of the member 21 brought into play.

In the preferred embodiments of the present invention, actuation of the grasping of the member 21 is based upon the wedging action coming into play as soon as the force 15 is removed and motion is reversed or motion is impelled by a load after the load support is removed. The wedging force is brought into actuated play by the movement with a minimum of time or mechanical lag allowed. The carrier 23, and thus the load member to which it is affixed, is stopped, held by the separately supported elongated member and prevented from moving almost instantaneously with the failure of the support member or support arrangement by the operation of the load transfer arrangement of the prevent invention.

Figure 6:
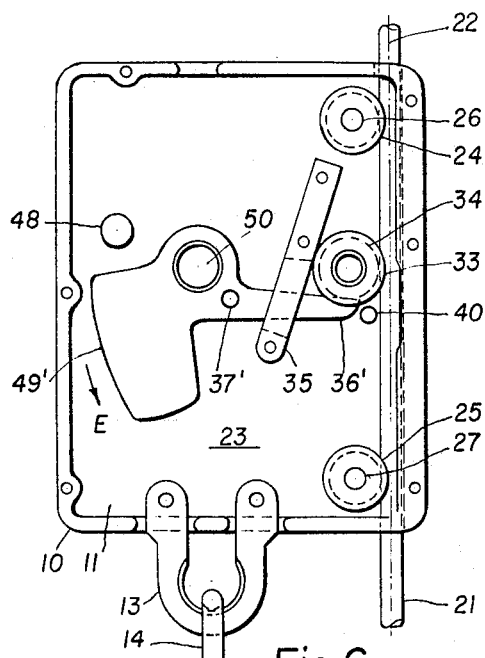
FIG. 6 is a front view, partly in section, of the modification of FIG. 5 in locked position.

The load transfer arrangement of the present invention functions efficiently, effectively and reliably to instantaneously halt the falling of the load member and in the case of a scaffold, for instance, can be arranged to prevent tilting the load member and is effective with heavy loads to stop the load member in a matter of small fractions of a second and allowing, usually under conditions of heavy load and grime on member 21, less than six inches of reverse transverse. The operation of the load transfer arrangement is depicted in FIGS. 4 and 6.

In the embodiment of FIGS. 3 and 4, the wedging member 33 is of substantially annular configuration and has a peripheral surface 34 and preferably a rounded groove formed in the peripheral surface. The wedging member 33 may be the same as the roller of FIGS. 9 and 10 or even the same as the roller of FIGS. 11 and 12. The notches in the rounded groove of the peripheral surface of the wedging member 33 may serve to enhance the gripping action of the surface of the rounded groove on the elongated member 21 when the load transfer arrangement is operated. The notches may also serve the same, matter removing purpose, as they do in the guide rollers. The wedging member is an independent unit which merely rests against or on other components but is not affixed to anything.

The transverse slots 32 have a particular advantage in that where the member 21 is dirty especially with large amounts of grease or ice, as gripping is taking place, excesses of foreign matter may be squeezed through the slots and dissipated through the center of wedging member 33 without danger of lodging in the wedging member 33 and clogging in causing uneffective operations.

A wedging guide 35 is mounted on the carrier 23 at an angle with the axis 22 of the member 21 so that it may direct the wedging member 33 toward and away from the elongated member 21. The wedging guide 35 is preferably slotted to permit the free movement of the moving member 36.

The moving member 36 is pivotally mounted on the carrier 23 at a pivot point 37. The operating arrangement of the embodiment of FIGS. 3 and 4 comprises an arm 38 pivotally mounted on the carrier 23 at a pivot point 39 and a coupling link 41 coupling the arm 38 to the moving member 36. A spring 42 is suitably supported on the carrier 23 by any suitable means such as, for example, a collar 43 extending from said carrier 23. The spring 42 may be mounted on a spring rod 44 having an end block 45. The spring 42 tends to force the rod 44 to extend by exerting a normal pressure between the collar 43 and end block 45. The spring rod 44 is pivotally mounted on the arm 38 at a pivot point 46 by suitable means. The coupling link 16 is pivotally affixed to the arm 38 at a pivot point 47.

During normal operation, as illustrated in FIG. 3, the force 15 applied in the direction of arrow A holds the arm 38 in normal load position shown in FIG. 3 against the spring force of the spring 42; the spring force being in the direction of arrow B. The coupling link 41 thus holds the moving member 36, its normal position with an external force applied to the mechanism as shown in FIG. 3 with the wedging member 33 resting against said moving member 36 and spaced from the member 21. The stop pin 40 helps cradle the wedging member 33 so that it is not in normal contact with the elongated member 21 until moved upward by the movement of the moving member 36. The carrier 23 is thus free to slide along the member 21 with the movement of the load member and without interfering with the normal up or down movement of the load member. As the carrier 23 slides along the member 21, the notches in the rounded grooves of the guide rollers 24 and 25 may function to clean said member 21 without impeding the motion of the support load.

When the force 15 is released, as illustrated in FIG. 4, by the absence thereof, the force in the direction of the arrow A is removed and the spring force of the spring 42 in the direction of the arrow B pivots the arm 38 in a counterclockwise direction C about its pivot point 39.

The coupling link 41 pivots the moving member 36 in a counterclockwise direction D about its pivot point 37 and the moving member moves the annular wedging member 33 into operative position wedged between the wedging guide 35 and the member 21 with the rounded groove of said wedging member abutting the member 21 and applying a great wedging force to said member 21 to halt the carrier 23 relative to the said member 21 and thereby support said carrier 23 on said member 21 and prevent said carrier 23 and the load member supported by it from moving. The wedging force applied to the member 21 by the wedging member 33 is quickly actuated and is very great, due to the lever moments provided by the pivotally mounted members and due to the fact that the wedging member 33 moves into wedging position in the same relative movement direction as the member 21 is moving after the member 21 starts to change direction under the load of the load member or move impelled by the unsupported load after removal of force 15.

The wedge guide 35 may be internally slotted, circumscribing the movement of the moving member 36 within ranges appropriate for the proper operation of the wedging member 36 and acting as a stop. The end block 45 is preferably round and has a collar 45′ upon which the spring 42 may rest, the rounded portion serving to facilitate freedom of movement of the spring 42 and rod 44 when any change in the force 15 necessitates movement of the internal parts. Any catching, jamming or any mechanical impedance must be avoided to eliminate time lag in actuating the load transfer arrangement especially in safety applications. When the force 15 controlling a heavy load is suddenly released, time lag may produce a tremendous momentum as the unsupported load member accelerates rendering load transfer either more difficult or causing a very rapid deceleration upon actuation of the grasping member 21 or causing damage to the load, support or even to the load transfer mechanism. A sudden deceleration after a momentum gain might cause difficulties, for example, in application with scaffolds, the actuation of the load transfer mechanism after a fast acceleration of descent might jolt people or material on such scaffold with possible disasterous effects to the people, material, or people or property below.

As shown in FIGS. 3 and 4, a weight 49 including a guide channel, a lower portion resting upon the collar 45′ is attached to the carrier 23.

This weight 49 resting on the collar 45′ provides an independent source for the actuation of the mchanism of the present invention and which can function to lock the wedging member 33 upon release of force 15 independent of the spring 42 or upon the failure for some reason of the spring 42. The guide channel and rounded edge of the weight 49 serve not only to guide the spring but to avoid any mechanical difficulties with relationship to the proximity of spring and weight 49.

The stop pin 48 in FIGS. 3 and 4 shown as a shoulder point to limit the movement of the mechanism within workable tolerances. The upper wall of the carrier 23 in this instance may serve the same function but a stop pin 48 has been indicated for emphasis. The same function of movement limitation within desired tolerances is served by the limits of the open portions within the wedging guide 35 as heretofore mentioned.

A stop 40 serves as a rest to freely hold the wedging member 33 free to move or even rotate when the device of the present invention as shown in FIGS. 3 and 4 is in normal position with an external force applied to the mechanism. The stop pin 40 preferably cradles the wedging member 33 cradled away from contact with the elongated member 21 as long as force 15 is applied. Any contact the wedging member 33 might have with the member 21 while in motion could only cause free rotation in a direction away from wedging engagement as the wedging member 33 rests upon the stop 40. Failure, breakage or the omission of the moving member 36 still maintains the wedging member 33 within operative proximity of the member 21 and wedging guide 35.

The freedom of movement of the wedging member 33 provides a further and independently operable actuation of the load transfer arrangement of the present invention. Upon movement reversal or movement impelled by an unsupported load, especially a sudden movement, the inertial change between the freely held wedging member 33 and the carrier 23 and member 21 forces the wedging member 33 into contact with the wedge guide 35, which holds the wedging member 33 only a small tolerance away from engagement with member 21, into engagement with both the member 21 and the wedging guide 35. With the movement change the relative motion of member 21 causes the wedging member 33 to rotate into wedging engagement with the guide 35 and member 21, causing a locking action independent of any spring or counterweight actuation. This can be clearly seen in the embodiments of the present invention as shown in FIGS. 3–8, 11–16, 19 and 21.

In the modification of FIGS. 5 and 6, the operating arrangement is weight actuated instead of spring actuated and the force 15 in normal position with an external force applied to the mechanism counteracts the gravitational force of the weight. The wedging member 33 and the wedging guide 35 are the same as those utilized in the embodiment of FIGS. 3 and 4.

The moving member 36' is pivotally mounted on the carrier 23 at a pivot point 37'. The operating arrangement of the embodiment of FIGS. 5 and 6 comprises a weight 49' affixed to the moving member 36' either directly or at the end of a rod; the weight being affixed to the moving member at the other side of the pivot 37' thereof from the portion in conact with the wedging member 33. The movement of the moving member 36' is limited by the size of the opening in the wedging guide 35 which may be a bar with an opening or a forklike member and by a stop pin 48 as a further precaution.

During normal operation as illustrated in FIG. 5, the force 15 which is applied to the moving member 36' at the point 50 by any suitable means, applies a force in the direction of arrow A to hold the moving member 36' in its unactuated position shown in FIG. 5 against the gravitational force of the weight 49'; the gravitational force of the weight being in the direction of arrow E. The force 15 thus holds the moving member 36' in normal position with an external force applied to the mechanism shown in FIG. 5 with the wedging member 33 resting against the moving member 36' and spaced from the member 21, cradled by stop pin 40, so that the load transfer arrangement is in normal position with an external force applied to the mechanism. The carrier 23 is thus free to slide along the member 21 in any direction parallel to the axis 22 with the movement of the load member and without interfering with the normal up or down movement of the load member. As the carrier 23 slides along the member 21, the notches in the rounded grooves of the guide rollers 24 and 25 function in the same manner as in the other embodiments.

When the force 15 is released, as illustrated in FIG. 6 by the absence thereof, the force in the direction of the arrow A is removed and the gravitational force of the weight 49' in the direction of the arrow E pivots the moving member 36' in a counterclockwise direction D' about its pivot point 37' and the moving member 36' moves the annular wedging member 33 into locked position wedged between the wedging guide 35 and the member 21 with the wedging member 33 abutting the member 21 and applying a great wedging force to said member 21 to lock the carrier 23 relative to the said member 21 and thereby support said carrier 23 on said member 21 and prevent said carrier 23 and the load member supported by it from moving.

The wedging member 33 moves into wedging position rotating in the same relative movement direction as the elongated member 21 is moving after the carrier 23 started to countermove.

Figure 8:
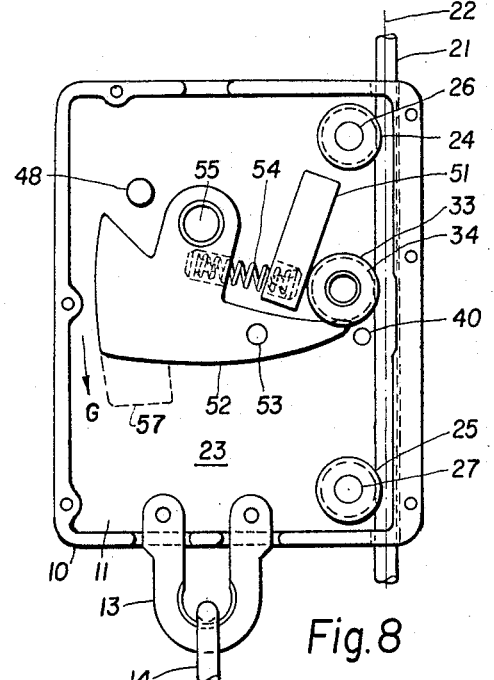
FIG. 8 is a front view, partly in section, of the embodiment of FIG. 7 in locked position.

In the embodiment of FIGS. 7 and 8, the wedging member 33 is the same as that utilized in the embodiments of FIGS. 3 and 4, 5 and 6. A wedging guide 51 is mounted on the carrier 23 at an angle with the axis 22 of the elongated member 21 so that it may direct the wedging member 33 toward and away from the safety member. The wedging guide 35 is positioned to permit pivotal movement of the moving member 52 about the pivot point 53; the moving member being pivotally mounted on the carrier 23.

The operating arrangement of the embodiment of FIGS. 7 and 8 comprises a spring 54 which is suitably mounted at one end on the wedging guide 51. The force 15 is applied to the moving member 52 at the point 55 by any suitable means. Precautionary stop pins 40 and 48 are provided to set movement limits within desired ranges.

The spring 54 normally tends to force moving member 52 away from the wedge guide 51. The spring 54 normally is set in a channel within wedge guide 51 and moving member 52 wide enough to permit free movment of member 52 without hitching the spring. Since there is arcuate movement of the moving member 52, the spring 54 may have its convolutions urged against the channels in the wedge guide 51 and the moving member 52. By having wide channels with rounded edges, danger of the spring convolutions hitching is overcome. For further precaution and guidance, pins may protrude from within these channels into the spring 54 to protect against the pin being snapped out of the channel or to even permit a broken spring to function within a channel.

During normal operations as illustrated in FIG. 7, the force 15 is applied in the direction of the arrow A to hold the moving member 52 in its normal position with an external force applied to the mechanism as shown in FIG. 7 against the spring force of the spring 54; the spring force being in the direction of the arrow F. The force 15 thus holds the moving member 52 in its normal position with an external force applied to the mechanism position shown in FIG. 7 with the wedging member 33 resting against said moving member and spaced from the safety member 21 cradled by the stop pin 40, so that the load transfer arrangement is not actuated. The carrier 23 is thus free to slide along the member 21 with the movement of the load member and without interfering with the normal movement of the load member. The guide rollers 24 and 25 function as in the other embodiments of the invention.

When the force 15 is released, as illustrated in FIG. 8 by the absence thereof, the force in the direction of the arrow A is removed and the spring force of the spring 54 in the direction of the arrow F pivots the moving member 52 in a counterclockwise direction G about its pivot point 53 and the moving member moves the annular wedging member 33 into locked position wedged between the wedging guide 51 and the member 21 with wedging member 33 abutting the member 21 and applying a great wedging force to said member 21 and thereby support said carrier 23 and the load member on said member 21 and prevent said carrier 23 and the load member supported by it from moving.

The embodiment of FIGS. 7 and 8 may be operated without spring 54 by affixing a weight 57 to the moving member 52, either directly or at the end of a rod; the counterweight function and its moment of force may be enhanced thereby. As shown in FIGS. 7 and 8 the shape of the moving member 52 has a tendency to normally act as a counterweight.

All of the embodiments can be adapted for fast actuation under conditions of very small clearance tolerances between the parts. Normal movement permitting free movement of the wedging member 33 and counter movement without the normal force 15 applied causing wedging engagement. In every embodiment of the present invention, the wedging force applied to the elongated member 21 upon actuation of the load transfer arrangement is very great due to the fact that the wedging member moves into wedging position in the same direction as the relative movement of the elongated member 21 after the carrier starts to countermove once support is removed.

The terms and expressions which are employed are used as terms of description, and it is recognized that various modifications are possible within the scope of the invention claimed.

I claim:
1. A load transfer arrangement adapted to transfer a load upon release of normal load support, comprising a carrier linked to a load member and normal load support means, load transfer actuating means integral to said carrier comprising a counter weight connected to a finger, a spring each adapted to actuate a finger connected to said counter weight, said counter weight and spring co-acting and adapted to actuate said finger, said normal load support means applied to said load transfer actuating means, said load transfer actuating means adapted to immediately act upon any change in normal support means, transferred load support means within said carrier, said transferred load support means separate from said load support means and substantially parallel to the axis of said carrier, and load transfer means within said carrier including; guide means between said transferred load supporting means; a freely moveable wedging member of a size in excess of the space between said fixed guide means and said transferred load support means adapted to be guided by said guide means; said finger engageable with said freely moveable wedging member and adapted to move said wedging member towards said guide means; said freely moveable wedging member carried by said carrier unconnected to said carrier and unconnected to said load transfer actuating means; said freely moveable wedging member adapted to engage said guide means and said transferred load support means immediately upon resumption of said normal load support.

2. A load transfer arrangement adapted to transfer a load upon release of normal load support, comprising a carrier linked to a load member and normal load support means, load transfer actuating means integral to said carrier comprising inertially actuatable wedging means; a counter weight connected to a finger; and a spring connected to said counter weight, said counter weight and spring co-acting and adapted to actuate said finger, said normal load support means applied to said load transfer actuating means, said load transfer actuating means adapted to immediately act upon any change in normal support means, transferred load support means within said carrier, said transferred load support means separate from said load support means and substantially parallel to the axis of said carrier, and load transfer means including; fixed guide means between said transferred load supporting means; a freely moveable wedging member of a size in excess of the space between said fixed guide means and said transferred load support means adapted to be guided by said guide means; said finger engageable with said freely moveable wedging member and adapted to move said wedging member towards said guide means; said freely moveable wedging member carried by said carrier unconnected to said carrier and unconnected to said load transfer actuating means; said freely moveable wedging member adapted to engage said fixed guide means and said transferred load support means immediately upon resumption of said normal load support.

References Cited by the Examiner

UNITED STATES PATENTS

| | | | |
|---|---|---|---|
| 604,557 | 5/1898 | Baum | 188—44 X |
| 924,750 | 6/1909 | Driscoll | 187—88 |
| 1,178,942 | 4/1916 | Pero et al. | 187—88 |
| 1,389,867 | 9/1921 | Griffin | 187—88 X |
| 1,707,099 | 3/1929 | Stein et al. | 187—88 |
| 2,538,477 | 1/1951 | Smith | 188—44 |
| 2,618,361 | 11/1952 | Zindt | 187—88 |
| 2,717,663 | 9/1955 | Higgins | 188—44 |
| 2,970,445 | 2/1961 | Suderow | 188—44 X |

FOREIGN PATENTS

| | | |
|---|---|---|
| 254,843 | 7/1926 | Great Britain. |
| 459,922 | 5/1928 | Germany. |
| 364,178 | 10/1938 | Italy. |

DUANE A. REGER, *Primary Examiner.*